INTERRUPTER CIRCUIT FOR TELEPHONE SYSTEMS
Filed March 23, 1964
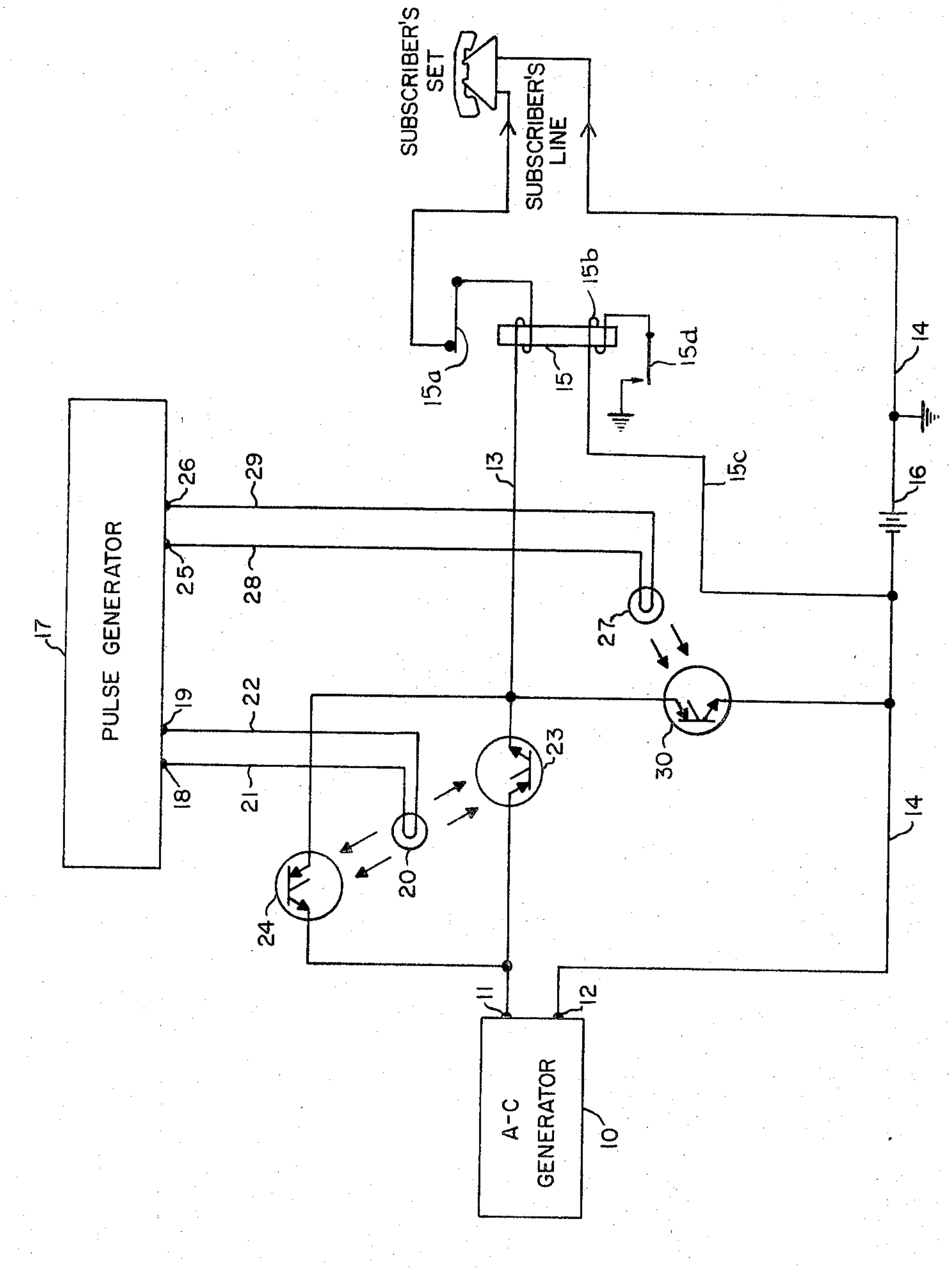
INVENTORS.
STEPHEN L. MERKEL
JEFFERSON T. MITCHELL
BY John Howard Smith
ATTY.

United States Patent Office 3,341,665
Patented Sept. 12, 1967

3,341,665 INTERRUPTER CIRCUIT FOR TELEPHONE SYSTEMS

Stephen L. Merkel and Jefferson T. Mitchell, Bay Village, Ohio, assignors to Lorain Products Corporation, a corporation of Ohio Filed Mar. 23, 1964, Ser. No. 353,913
5 Claims. (Cl. 179—84)

This invention relates to signaling circuits and is directed more particularly to improved means for impressing an interruption pattern on such circuits.

In the telephone industry, a subscriber being called is summoned to the phone by the ringing of a bell which results when a signal from ringing equipment is applied to the subscriber's line. It is desirable, usually, to interrupt or make this ringing non-continuous in a predetermined interruption pattern, first because interrupted ringing has been found more satisfactory in attracting the subscriber's attention and secondly, the use of an interruption pattern enables a given ringing generator to be used for a multiplicity of subscriber's lines.

It will be seen that by ringing the subscriber's bell at the rate of, for example, one second on and three seconds off, three additional subscribers, each having one second ringing "on" time, may be accommodated from the same ringing equipment. Thus, maximum effective use of such equipment is obtained.

In the past the desired on-off ringing interruption pattern or code has been obtained by several methods. One method is to use a number of cams on a shaft driven by a motor, the cams opening or closing switches to apply the pulsed ringing signal to the selected line. This method is subject to all the difficulties inherent in complicated mechanical arrangements utilizing gear trains and cams and, in addition, the switch contacts, which are subject to arcing must be periodically replaced or serviced.

More recently, transistors have come into use to apply the pulsed output from the ringing machine to the subscriber's line. These circuits are efficient and reliable but, to some extent, involve more complex circuitry than is utilized by the present invention.

It is an object of the invention to provide ringing circuitry which is electrically isolated from its associated code generating circuitry.

It is another object of the invention to provide for ringing circuitry, a gate means which has very low impedance when conducting.

Another important object of the invention is to provide improved pulsing, interruption circuitry utilizing light sensitive means for gating a signal tone in a predetermined interruption pattern.

Still another object of the invention is to provide a relatively simple and inexpensive gate means for a telephone ringing circuit thereby eliminating cams and expendable contact points.

A further object of the invention is to provide light sensitive switches in the current path between a ringing generator and a load whereby a light source controlled by a pulse or code generator periodically illuminates light sensitive switches thereby causing current to flow between the ringing generator and the load in a predetermined pattern.

Still another object of the invention is to provide, in an interrupter, improved circuitry to enable the use of isolated gating means to control the flow of an A-C signal by impressing the interruption pattern on that signal in such a manner that during the "on" period the signal generator and the load are functionally connected during both half cycles of the A-C signal.

One present type of light sensitive switch which is adaptable to the present invention takes the form of a silicon semi-conductor of the PNPN type which is responsive to illumination in that it is rendered electrically conducting when subjected to a ray of light. The device is electrically unidirectional and remains conducting until its source of current is de-energized. It will be understood, however, that photoresistors such as cadmium-sulphide cells which are light activated, bi-directional, current conducting devices may be used in place of the light sensitive switches described herein particularly when A-C currents are involved.

Another object of the invention is to provide, in an electrical circuit arranged to deliver pulsed energy to a load, a first circuit section including light sensitive switch means and light emitting means for energizing the light sensitive switch means during delivery of pulsed energy together with another circuit section having other light sensitive switch means and other light emitting means arranged to energize said second light sensitive switch means between pulses delivered to said load.

It is a more specific object of the invention to provide in ringing circuitry, light sensitive switches which, when subjected to light rays, serve to allow current to pass from a ringing generator to a load to afford a signal, together with other light sensitive switch means arranged to provide a D-C path for trip battery current in response to illumination from a light source when the other light sensitive switches are not energized.

Other objects and advantages of the invention will become apparent from the following description and accompanying drawings in which:

The single figure is a combination block diagram and schematic representation of a ringing system incorporating the invention.

It will be understood that though the invention is described herein for use in conjunction with a telephone system, it may be used with any load for which an alternate direct current path is required.

Referring to the figure, it will be seen that the circuit includes an A-C generator 10 having output terminals 11 and 12 connected to the subscriber's line by means of leads 13 and 14, respectively. A trip relay 15 and a trip battery 16 connected in leads 13 and 14, respectively, disconnects the ringing current from the subscriber's line when the receiver of the subscriber's telephone set is picked up as will be more fully explained presently.

To the end that the desired interruption pattern, for example, one second "on" and three seconds "off" will be impressed upon the ringing current, there is provided a pulse or coding generator 17 having output terminals 18 and 19 which are connected to an incandescent lamp 20 by means of leads 21 and 22, respectively. Terminals 18 and 19 serve as a first power output for the pulse generator 17. The "on" periods for the A-C ringing current occur when power is provided by output terminals 18 and 19 to light the incandescent lamp 20.

To the end that ringing current will be supplied to the subscriber's line during the "on" time but blocked during the "off" time, a light sensitive switch 23 is connected serially in lead 13 and located in close physical proximity to the incandescent lamp 20. The symbol used for the light sensitive switch 23 is that illustrated in American Standard Graphical Symbols For Electrical and Electronic Diagrams, Y32.2—1962. This symbol is used in FIGURE 1 to represent each of the light sensitive switches utilized in the circuit.

The light sensitive switch 23 is a unidirectional device which, as explained above, conducts when subjected to light rays from lamp 20 and which will continue to conduct after the illumination has ceased until the current through it is interrupted. This current interruption may be produced by opening the current path in which the light sensitive switch is located. However, if the light sensitive switch is connected in an A-C circuit, the interruption will occur when the A-C passes through zero. The light sensitive switch will then remain non-conducting until again subjected to light rays.

Since the light sensitive switch 23 is a unidirectional device, it will allow only one half cycle of the alternating current to flow from the A-C generator and through the subscriber's line. In order to pass the alternate half cycle of current, an oppositely poled light sensitive switch 24 is connected in parallel with switch 23.

From the foregoing it will be seen that during the "on" period of the incandescent lamp 20, both light sensitive switches 23 and 24 will be in a condition to conduct. As the output terminal 11 of the A-C generator 10 becomes increasingly positive with respect to output terminal 12, current will flow through light sensitive switch 23, lead 13, trip relay 15, the subscriber's telephone, lead 14 and trip battery 16 to output terminal 12. On the alternate half cycle, when the output polarity of the A-C generator 10 has reversed, current will flow from the output terminal 12 through lead 14, trip battery 16, the subscriber's telephone, trip relay 15, lead 13 and the light sensitive switch 24 to output terminal 11. Thus, when the incandescent lamp 20 is energized, light sensitive switches 23 and 24 alternately conduct to provide a continuous pulse throughout a complete cycle of the output of A-C generator 10, this pulse being dictated by the pulse generator 17.

The subscriber's set, while the receiver is in place, appears as a capacitive load to the A-C generator 10 when switches 23 and 24 conduct and for this reason passes the A-C ringing signal while blocking any D-C which would flow due to the presence of trip battery 16 in the circuit. However, when the answering party picks up the reecive, the telephone being run becomes conductive in that it becomes a resistive load permitting direct current to flow from the positive plate of the battery 16 through the telephone, trip relay 15, lead 13, switch 24, A-C generator 10 and lead 14 to the negative side of the battery. This current flow energizes the trip relay 15 causing its contacts to open thus disconnecting the subscriber's line from the A-C source 10 to stop the ringing of the telephone set.

To the end that the contact 15*a* of trip relay 15 is held open so long as the subscriber's set is in the resistive, "off-hook" condition a lockup winding 15*b* is utilized. This winding is energized through contact 15*d* to ground and through lead 15*c* to battery 16. When the D-C circuit is open by the resistive condition of the subscriber's set the above described D-C loop is energized by the closing of contact 15*d* under the influence of initial flow of D-C current from the subscriber's set, through contact 15*a* to conductor 13. Through contact 15*d* and, winding 15*b*, the energy is supplied to open and hold open the contactor 15*a* to break the A-C ringing circuit. This closed condition of contact 15*d* and the open condition of contact 15*a*, the talking positions, prevails until the receiver is placed in the "on-hook" position when ground from contact 15*d* is removed in any suitable manner. Under these circumstances contact 15*d* opens and contact 15*a* closes to restore circuit conditions in readiness for another ringing signal through contact 15*a*.

If the telephone receiver is picked up during the "off" period, or quiet interval of the pulse or interruption pattern, the light sensitive switches 23 and 24 are not conducting since lamp 20 is not energized. Therefore, there is no path for direct current to energize the trip relay 15. To the end that trip relay 15 may be energized to disconnect the subscriber's line from the ringing current should the receiver be picked up during the quiet interval when incandescent lamp 20 is "off" and light sensitive switches 23 and 24 are consequently non-conducting, a light sensitive switch 30 is connected between leads 13 and 14, as shown.

The conduction of light sensitive switch 30 is controlled by connecting output terminals 25 and 26 of the pulse generator 17 to an incandescent lamp 27 by means of leads 28 and 29, respectively. This second power output of the pulse generator 17 controls the incandescent lamp 27 and is energized only during the quiet interval when there is no output from terminals 18 and 19. Any suitable means may be provided in the pulse generator 17 to create alternate energization of the first output terminals 18 and 19 and the second output terminals 25 and 26.

As described previously, if the telephone receiver is picked up, the telephone becomes conductive. If this occurs during a quiet interval, current will flow from the positive side of the battery 16 through lead 14, through the telephone, the trip relay 15, lead 13 and light sensitive switch 30 to the negative side of trip battery 16. This current flow energizes the trip relay and disconnects the subscriber's line from the ringing generator as described previously. Thus, during quiet intervals when light sensitive switches 23 and 24 are non-conducting, light sensitive switch 30 provides a path for trip current to energize the trip relay and disconnect the A-C generator from the subscriber's line.

It will be seen that by providing additional light sensitive switch circuits connected between respective subscriber's lines and the output terminals of the A-C generator and by providing additional outputs on the pulse generator 17 to control these additional light sensitive switch circuits, a plurality of subscriber's lines may be arranged to severally and selectively receive ringing current from a single A-C generator. As an example, pulse generator 17 may be provided with a total of four "on time" power outputs each of which is severally energized for a different one second period of a four second cycle. Now, by connecting each of these outputs to a respective incandescent lamp corresponding to lamp 20, these lamps being arranged to illuminate light sensitive switches in respective light sensitive switch circuits, a total of four subscriber's lines may be supplied with interrupted ringing current from the same A-C generator. The pulse generator 17 may also be provided with additional quiet interval power outputs to energize the respective trip current light sensitive switches in each of the additional light sensitive switch circuits. Thus it will be seen that a multiplicity of subscriber stations is accommodated by multiplying the circuitry of one invention.

From the foregoing it will be seen that we have provided a pulse generator to operate incandescent lamps in a predetermined pattern whereby the conduction of light sensitive switches interposed in the current path between an A-C generator and a subscriber's line corresponds to the "on" time of the incandescent lamp to impress an interruption pattern upon the A-C. The pulse generator may also operate a second lamp to activate a light sensitive switch which provides a D-C path for trip current should the load become conductive during the quiet interval when the A-C is interrupted.

It will be understood that the embodiments shown herein are for explanatory purposes and may be changed or modified without departing from the spirit and scope of the invention as set forth in the claims appended hereto.

What we claim is:

1. In a circuit adapted to conduct current between an A-C power source and a load, in combination, pulse generating means, light source means arranged to turn off and on in response to a predetermined change of conditions in said pulse generating means, light sensitive switch means, means for connecting said light sensitive switch means between the A-C source and said load, a network for said light sensitive means arranged to be energized during both half cycles of an A-C cycle from the A-C source by a change in electrical characteristics in said light sensitive switch means responsive to change of light intensity from said light source in accordance with a predetermined change of conditions in said pulse generator means.

2. In a circuit adapted to supply a periodically interrupted A-C to a load and to provide a path for D-C during the A-C interruption, in combination, an A-C source, a pulse generator having first and second alternately energized outputs, a D-C source, a first light source controlled from said first pulse generator output, first light sensitive switch means arranged to be rendered conducting by illumination of said first light source from said first pulse generator output, means for connecting said first light sensitive switch means in a current path between the A-C source and the load, a second light source controlled from said second pulse generator output, second light sensitive switch means arranged to be rendered conducting by illumination of said second light source from said second pulse generator output and means for connecting said second light sensitive switch means in series with said D-C source and the load whereby a D-C path is energized when said first output of the pulse generator is de-energized.

3. In a telephone circuit adapted to supply a periodically interrupted A-C to a telephone subscriber's set which becomes conductive when the receiver is raised, said circuit including a D-C relay connected serially in the A-C path, in combination, an A-C source, a pulse generator having first and second alternately energized power outputs, a first light source controlled from said power output of said pulse generator, a first light sensitive switch means of the type adapted to be rendered conducting when illuminated, said switch means being arranged to be illuminated by said first light source and being interposed in a current path between the A-C source and the load, a D-C source serially connected in the A-C path, a second source of light controlled from said second power output of said pulse generator, second light sensitive switch means arranged to be illuminated by said second light source and connected in serial relation to said D-C source, the D-C relay and the subscriber's set, whereby said second light sensitive switch means affords a path for D-C through the D-C relay and subscriber's set when the latter becomes conductive and said second light source is energized by said pulse generator.

4. In a circuit adapted to supply energy to ringing a telephone subscriber's set of the type comprising capacitive load when the receiver is in position and which becomes conductive when the receiver is raised, and including a source of ringing energy, a pulse generator adapted to apply energizing pulses to the ringing energy to provide a predetermined pulse pattern of discontinuous ringing energy, a disconnect relay in series with the source of ringing energy and the subscriber's set and a source of D-C power in series with said relay, in combination, a first light source adapted to be energized during pulses of ringing energy a second light source adapted to be energized between pulses of ringing energy, first light sensitive switch means responsive to said first light source to be rendered electrically conducting when subjected to light therefrom, means for connecting said first light sensitive switch means in series with the source of ringing energy and the subscriber's set, second light sensitive switch means responsive to said second light source and means for connecting said second light sensitive means in series with the disconnect relay and the source of D-C power whereby the source of ringing energy is disconnected from the subscriber's set when the first light source is energized and the receiver of the subscriber's set is raised and when the second light source is energized and the receiver of the subscriber's set is raised.

5. In a circuit adapted to supply a periodically interrupted circuit to a load of the type which is intermittently conductive to D-C, in combination, an A-C source, means for connecting the A-C source to the load, a D-C source, a D-C disconnect relay in series therewith and with said load, pulse generating means for applying a predetermined, discontinuous pulse pattern on the A-C current, a first source of light controlled by said pulse generating means to be energized during applied pulses from said generating means, first light sensitive switch means responsive to light intensity to be rendered electrically conducting thereby, said first light sensitive switch means being arranged to be illuminated by said first source of light, means for connecting said first light sensitive switch means serially with said A-C source and the load whereby A-C flows from said A-C source to the load only during the applied pulses in said predetermined pattern, a second source of light controlled by said pulse generating means to be energized between applied pulses from said generating means, second light sensitive switch means responsive to light intensity to be rendered electrically conducting thereby, said second light sensitive switch means being arranged to be illuminated by said second source of light, means for connecting said second light sensitive switch means serially with said D-C source, said disconnect relay and said load, whereby a path for D-C between said D-C source and the disconnect relay through said load is provided by said second light sensitive switch means between applied pulses in the predetermined pattern when said load is conductive to D-C and a path for D-C between said D-C source and the disconnect relay through said load and said A-C source is provided by said first light sensitive switch means during said applied pulses when said load is conductive to D-C.

References Cited

UNITED STATES PATENTS

| | | | |
|---|---|---|---|
| 3,192,323 | 6/1965 | Hersey | 179—84 |
| 3,235,669 | 2/1966 | Lanham | 179—84 |

KATHLEEN H. CLAFFY, *Primary Examiner.*

H. ZELLER, *Assistant Examiner.*